Patented June 9, 1942

2,285,626

UNITED STATES PATENT OFFICE 2,285,626

SUBSTITUTED PHENOL

Fred Lowell Taylor and John E. Livak, Midland, Mich., assignors to The Dow Chemical Company, Midland, Mich., a corporation of Michigan No Drawing. Application April 27, 1940,
Serial No. 331,945

4 Claims. (Cl. 260—619)

This invention relates to new substituted phenols, and in particular concerns substituted phenols containing three or more substituents, at least two of which are α-phenylethyl groups located para and/or ortho to the hydroxyl group. Such compounds may be defined by the general formula

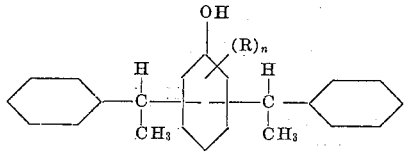

wherein R represents a halogen, alkyl, alkoxy, cycloalkyl, aryl, or aralkyl group, n represents an integer not greater than 2, and the α-phenylethyl group occupies positions ortho and para to the hydroxyl group. These compounds are usually obtained as high-boiling viscous liquids, although in some cases they may occur as resinous or crystalline solids. They are substantially insoluble in water but are readily dissolved by organic solvents such as methanol, acetone, chlorobenzene, ethanol, etc. Certain of these compounds may be employed in the manufacture of phenol-aldehyde condensation products, and all of them are valuable intermediates in the preparation of plasticizing agents, wetting agents, and other organic chemicals.

The new compounds of the present class may be prepared by direct reaction between an α-haloethylbenzene, such as α-chloroethylbenzene or α-bromoethylbenzene, and a substituted phenol having at least two of the positions ortho and para to the hydroxyl group unoccupied, e. g. 2-chlorophenol, cresol, o-phenylphenol, guaiacol, o-cyclohexylphenol, benzylphenol, 3.5 - diethylphenol, etc. The reaction is conveniently carried out simply by heating a mixture of the reactants at a temperature at which hydrogen halide is readily evolved. Such temperature depends somewhat upon the particular reactants employed but is usually between about 100° C. and about 200° C. If desired, the reaction may be carried out under reduced pressure or in a current of inert gas in order to facilitate removal of the hydrogen halide. Upon completion of the reaction, the poly-α-phenylethyl-substituted phenol product is recovered from the reaction mixture and purified by distillation under reduced pressure or by crystallization from a suitable solvent. Usually there is obtained along with the desired poly-substituted product a small amount of a mono-substituted compound. Such compound is a valuable by-product and may be employed as an intermediate or it may be further reacted with an α-haloethylbenzene to form the poly-substituted product.

The new products may also be prepared by reacting styrene with a substituted phenol in the presence of an acid catalyst. Also, a mixture of styrene and an α-haloethylbenzene may be employed, whereby the hydrogen halide formed by reaction between the α-haloethylbenzene and the phenol acts as a catalyst for the reaction between the styrene and the phenol.

The following examples illustrate the preparation of several of the compounds of the present class but are not to be construed as limiting the invention.

Example 1

In a flask fitted with a dropping funnel, stirrer, thermometer, and reflux condenser, 188 grams (2.0 moles) of phenol was heated to a temperature of about 85° C. and 1074 grams of crude α-chloroethylbenzene containing ethylbenzene as an impurity was added from the dropping funnel over a period of ½ hour. The temperature was then gradually raised to 130° C. over a period of 2 hours, after which an additional 1070 grams of crude α-chloroethylbenzene was added and the heating continued for 2 hours. The reaction mixture was then fractionally distilled under reduced pressure whereby there was obtained tri-α-phenylethylphenol, a light-yellow viscous liquid distilling at approximately 250°–260° C. under 3 millimeters pressure and having a specific gravity of about 1.085 at 25/25° C. and an index of refraction of 1.6067 at 25° C. This product has the structural formula

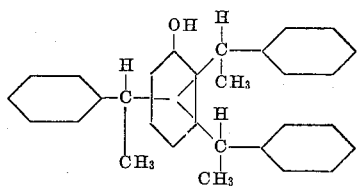

Example 2

A mixture of 810 grams (7.5 moles) of mixed cresols and 21 grams of α-chloroethylbenzene was heated to 100° C. and 780 grams (7.5 moles) of styrene was added gradually over a period of 1 hour. The heating was continued for 1½ hours after which the temperature was raised to 150° C. for a short time to insure completion of the reaction. The mixture was then fractionally distilled under reduced pressure whereby the product, di-α-phenylethyl-cresol, was obtained as a colorless viscous liquid distilling at approximately 210°–220° C. under 2 millimeters pressure and having a specific gravity of about 1.071 at 25/25 C., and an index of refraction of 1.5963 at 25° C. This product has the formula

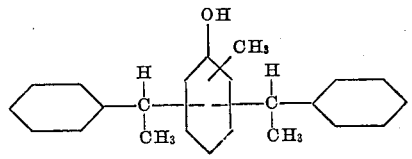

wherein the α-phenylethyl substituents occupy positions ortho and para to the hydroxyl group.

*Example 3*

A mixture of 600 grams (4.0 moles) of 4-tertiarybutyl-phenol and 21 grams of α-chloroethylbenzene was heated to 160° C. and 832 grams (8.0 moles) of styrene was added as in Example 2. Heating was continued for 7 hours after which the reaction mixture was fractionally distilled under reduced pressure. Di-α-phenylethyl-4-tertiarybutyl-phenol was obtained as a colorless viscous liquid distilling at approximately 211°–212° C. under 2 millimeters pressure and having a specific gravity of about 1.030 at 25/25° C. and an index of refraction of 1.5732 at 25° C. This product may be represented by the formula

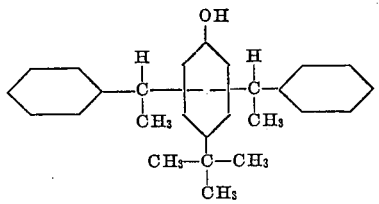

By reacting o-phenylphenol with α-chloroethylbenzene in a manner similar to that described in Example 1, di-α-phenylethyl-2-phenylphenol was obtained as a colorless viscous liquid distilling at approximately 255°–265° C. under 2 millimeters pressure and having a specific gravity of about 1.103 at 25/25° C. Other compounds of the present class which may be prepared as hereinbefore described are: 4,6-di-(α-phenylethyl)-2-benzylphenol, 2,4-di-(α-phenylethyl)-3-hexylphenol, 4,6-di-(α-phenylethyl)-2-cyclohexylphenol, 2,6-di-(α-phenylethyl)-4-isopropoxyphenol, 2,6-di-(α-phenylethyl-4-bromophenol, 2,6-di-(α-phenylethyl)-4-ethylphenol, 4,6-di-(α-phenylethyl)-2-chlorophenol, 2,4-di-(α-phenylethyl)-3,5-dimethylphenol, etc.

Other modes of applying the principle of our invention may be employed instead of those explained, change being made as regards the materials or methods herein disclosed, provided the product stated by any of the following claims or the equivalent of such stated product be obtained.

We claim:

1. A substituted phenol having the general formula

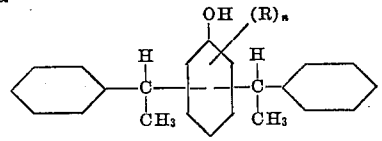

wherein R represents a substituent selected from the class consisting of alkyl and cycloalkyl groups, $n$ represents an integer not greater than 2, and the α-phenylethyl substituents occupy two of the positions ortho and para to the hydroxyl group.

2. A substituted phenol having the general formula

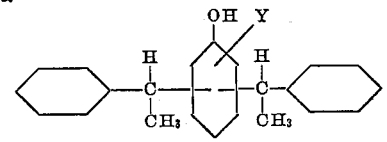

wherein Y represents an alkyl radical and the α-phenylethyl substituents occupy two of the positions ortho and para to the hydroxyl group.

3. A di-(α-phenylethyl)-4-tertiarybutyl-phenol distilling at approximately 211°–212° C. under 2 millimeters pressure and having a specific gravity of about 1.030 at 25/25° C.

4. A di-(α-phenylethyl)-cresol distilling at approximately 210°–220° C. under 2 millimeters pressure and having a specific gravity of about 1.071 at 25/25° C.

FRED LOWELL TAYLOR.
JOHN E. LIVAK.